United States Patent
Ye

(10) Patent No.: US 8,073,270 B2
(45) Date of Patent: Dec. 6, 2011

(54) IMAGE DECODING APPARATUS AND METHOD

(75) Inventor: Xiaowei Ye, Shanghai (CN)

(73) Assignee: Silicon Motion, Inc., Jhubei, Hsinchu County (TW)

( * ) Notice: Subject to any disclaimer, the term of this patent is extended or adjusted under 35 U.S.C. 154(b) by 750 days.

(21) Appl. No.: 12/211,422

(22) Filed: Sep. 16, 2008

(65) Prior Publication Data
US 2010/0067811 A1    Mar. 18, 2010

(51) Int. Cl.
*G06K 9/36* (2006.01)
(52) U.S. Cl. ........................................ 382/233; 382/246
(58) Field of Classification Search .................. 382/166, 382/232, 233, 235, 246, 250; 358/426.13, 358/426.14; 341/67
See application file for complete search history.

(56) References Cited

U.S. PATENT DOCUMENTS

| 5,479,527 | A | * | 12/1995 | Chen | 382/232 |
| 5,642,115 | A | * | 6/1997 | Chen | 341/67 |
| 5,825,312 | A | | 10/1998 | D'Ortenzio | |
| 6,067,384 | A | | 5/2000 | Manickam et al. | |
| 6,798,365 | B2 | | 9/2004 | Kim et al. | |
| 7,050,656 | B2 | | 5/2006 | Bhaskaran et al. | |
| RE39,925 | E | | 11/2007 | Mitchell et al. | |

* cited by examiner

*Primary Examiner* — Duy M Dang
(74) *Attorney, Agent, or Firm* — Thomas|Kayden

(57) ABSTRACT

An image decoding apparatus is provided, including a parser and an AC decoder. The parser is provided for parsing a bit stream to acquire a first unit. The first unit includes a DC code and a plurality of AC codes respectively corresponding to a DC coefficient and AC coefficients for a first block of the image. The AC decoder generates a plurality of first AC coefficients for the first block by decoding the plurality of AC codes of the first unit, and determines whether the number of the plurality of first AC coefficients exceeds a predetermined parameter. If so, the AC decoder obtains a second unit of the bit stream corresponding to a second block following the first block by performing an AC bypassing process on the first unit. Each AC code comprises a Huffman code and a VLI code.

29 Claims, 9 Drawing Sheets

IMAGE DECODING APPARATUS AND METHOD

BACKGROUND OF THE INVENTION

1. Field of the Invention

The invention relates generally to image decoding, and more particularly to an image decoding apparatus and method for performing high-speed processing for low display resolutions.

2. Description of the Related Art

The Joint Photographic Expert Group (JPEG) format is a commonly used image compression format. The JPEG format benefits multimedia communications, as images with large number of pixels can be compressed using the JPEG format to be compatible with digital cameras, mobile phones or computers. Although the JPEG format advantageously reduces storage facility requirements for images, enormous amounts of computations and time are required for encoding and decoding, especially for high throughput demands.

To decompress a JPEG compressed bit stream, the ordinary decoding process includes header parsing, Huffman decoding, de-quantization, Inverse Discrete Cosine Transform (IDCT), downscaling, and color space converting. In general, the resolution of images captured and pre-stored by digital cameras is significantly larger than the resolution for display devices, such as televisions or printers. While being converted or decoded to a lower resolution from a higher resolution, unnecessary detailed information is dropped from the original images. For example, U.S. Pat. Nos. H1684, 6,067,384 and 7,050,656 disclose some techniques for improving decoding efficiency during the IDCT and the downscaling process.

Additionally, various techniques, e.g., U.S. Pat. Nos. RE039,925, 6,798,365 and 5,825,312, have been proposed to improve the decoding efficiency during the Huffman decoding process. However, all encoded data for a unit block of an original image, such as DCT coefficients for an 8 by 8 block, still need to be fully derived or decoded during the Huffman decoding process.

FIG. 1 is a flowchart of a conventional Huffman decoding process 10 illustrating operations of decoding an 8 by 8 block. Generally, each 8 by 8 block of an original image is transformed into sixty-four frequency coefficients, called DCT coefficients, consisting of one DC coefficient and subsequently sixty-three AC coefficients. When a specific unit of a bit stream corresponding to the block is acquired, a DC decoding process is first performed on the specific unit to obtain a DC coefficient for the block (step S102). Further, an AC decoding process is implemented to decode the remaining specific unit and generate AC coefficients for the block (step S104). Meanwhile, a determination process is provided for determining whether all AC coefficients for the block have been decoded (step S106). That is, the conventional Huffman decoding process 10 is only completely finished when sixty-three AC coefficients for the block are generated. Since the operation of the AC decoding process is redundant and time-consuming, it becomes impractical when used for low display resolutions, wherein a limited number of AC coefficients are required and the specific unit may be only partially decoded to generate sufficient AC coefficients for retaining acceptable fidelity.

Thus, a need exists for an improved decoding method and apparatus capable of instantaneously bypassing unnecessary AC coefficients for a block during the Huffman decoding process, thereby improving the overall decoding efficiency.

BRIEF SUMMARY OF THE INVENTION

Therefore, the invention provides an image decoding apparatus and method improving block decoding performance by efficiently bypassing unnecessary AC coefficients for low display resolutions without extra processing costs.

In one aspect, the invention is directed at an image decoding apparatus capable of rapidly bypassing unnecessary AC coefficients for a block during the Huffman decoding process. The image decoding apparatus comprises a parser and an AC decoder. The parser is provided for parsing a bit stream to acquire a first unit. The first unit comprises a DC code and a plurality of AC codes respectively corresponding to a DC coefficient and AC coefficients for a first block of the image. The AC decoder generates a plurality of first AC coefficients for the first block by decoding the plurality of AC codes of the first unit, and determines whether the number of the plurality of first AC coefficients exceeds a predetermined parameter. If so, the AC decoder obtains a second unit of the bit stream corresponding to a second block following the first block by performing an AC bypassing process on the first unit, wherein each AC code comprises a Huffman code and a VLI code.

In another aspect, an image decoding method is provided for bypassing unnecessary AC coefficients for a block during the Huffman decoding process. The image decoding method first acquires a first unit of a bit stream. The first unit comprises a DC code and a plurality of AC codes respectively corresponding to a DC coefficient and AC coefficients for a first block of the image. Then, a first stage of an image decoding procedure is performed on the first unit to generate a plurality of first AC coefficients for the first block according to the plurality of AC codes. Further, it is determined whether the number of the plurality of first AC coefficients exceeds a predetermined parameter. If so, a second stage of the image decoding procedure is performed on the first unit to obtain a second unit of the bit stream corresponding to a second block following the first block. The AC code comprises a Huffman code and a VLI code.

BRIEF DESCRIPTION OF THE DRAWINGS

The invention will become more fully understood from the detailed description, given herein below, and the accompanying drawings. The drawings and description are provided for purposes of illustration only, and, thus, are not intended to be limiting of the invention.

DETAILED DESCRIPTION OF THE INVENTION

Figure 1:
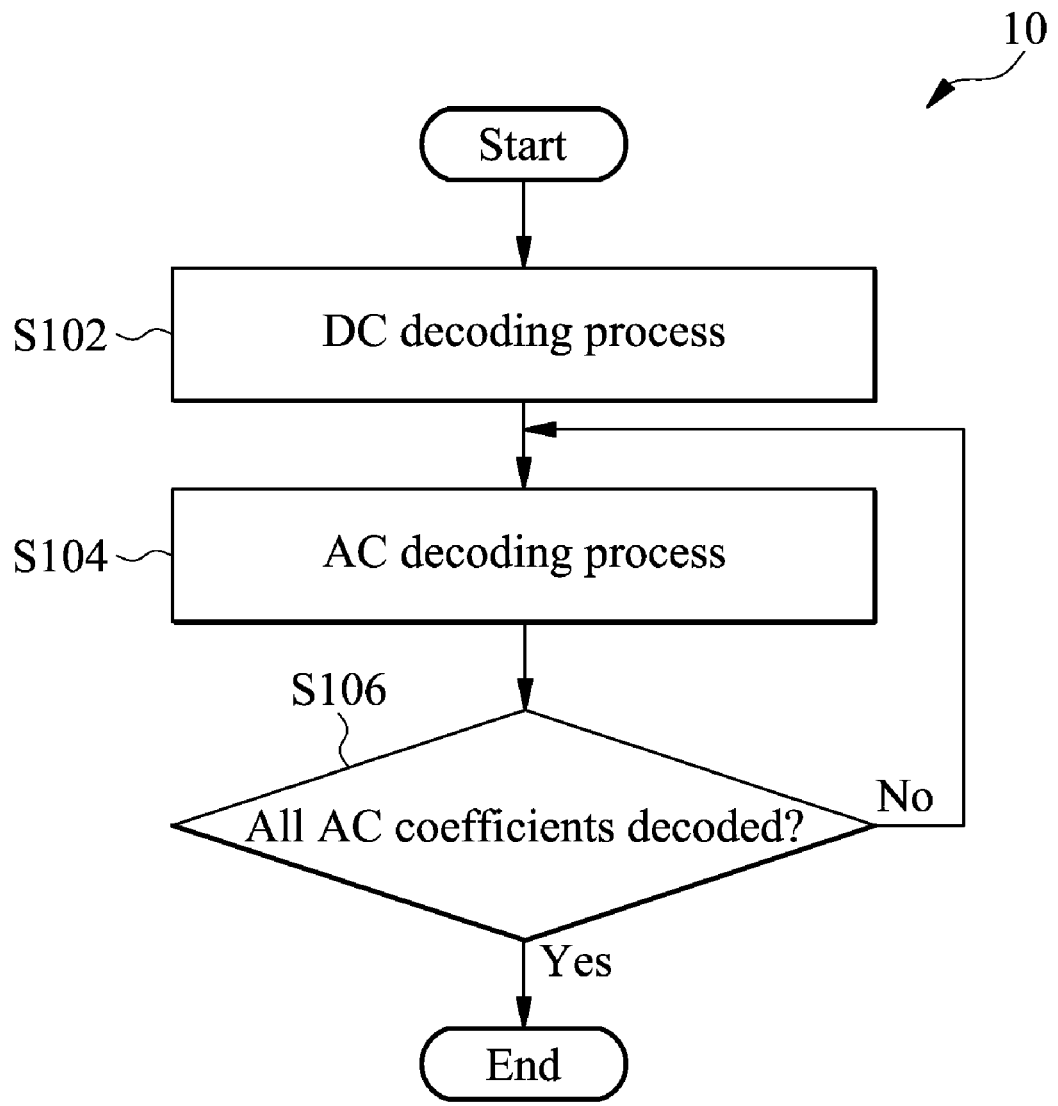
FIG. 1 is a flowchart of a conventional Huffman decoding process illustrating operations of decoding a block.
Figure 2:
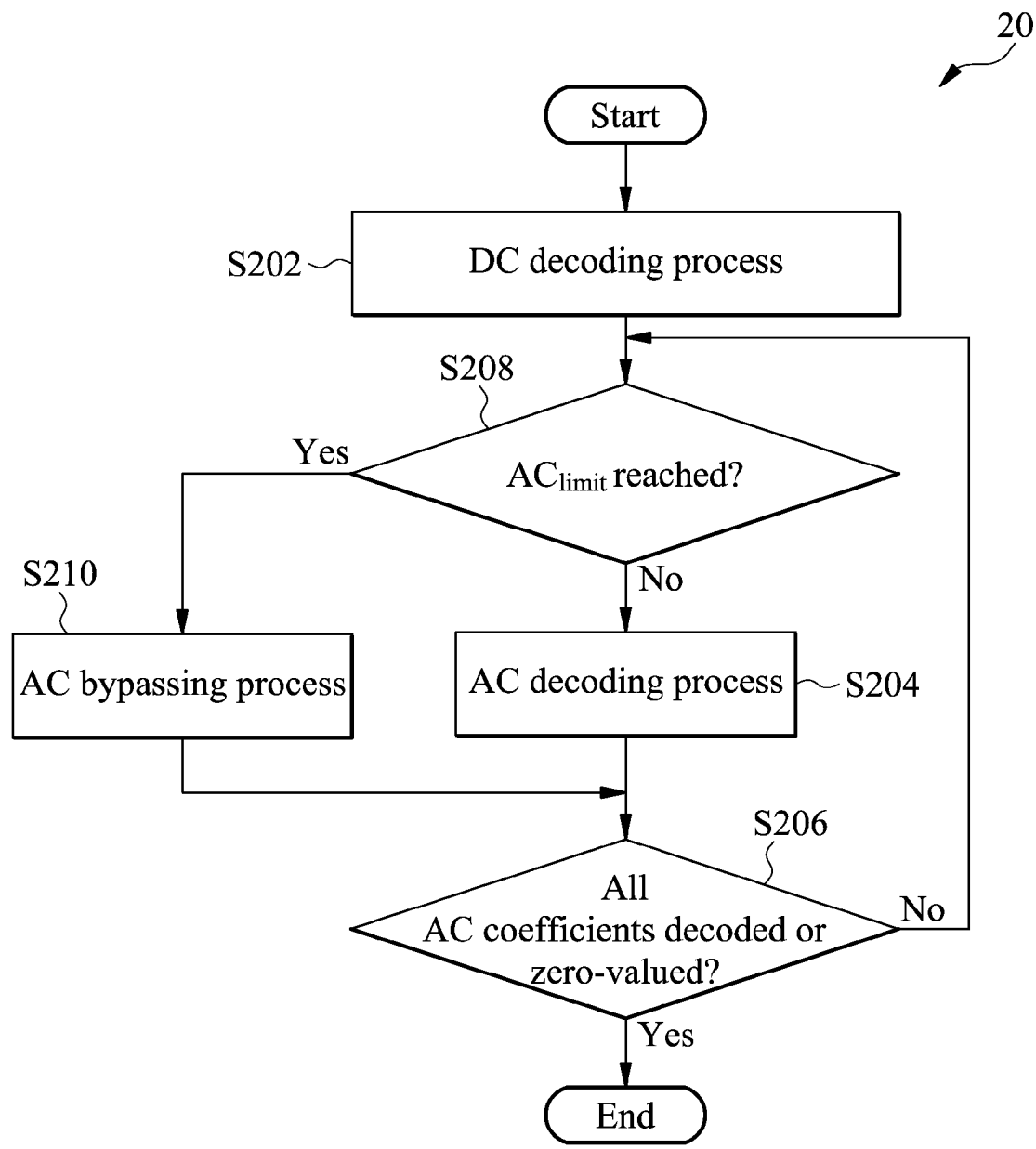
FIG. 2 is a flowchart of a decoding process illustrating operations of decoding a block in accordance with the invention.

FIG. 2 is a flowchart of a decoding process 20 illustrating operations of decoding an 8 by 8 block, such as a first block, in accordance with the invention. The decoding process 20 is substantially similar to the conventional Huffman decoding process 10 of FIG. 1. Specifically, the significant difference of FIG. 2 from FIG. 1 is an AC bypassing process.

According to one embodiment, a first unit of a bit stream is acquired for decoding. As mentioned previously, the first unit comprises a DC code and a plurality of AC codes respectively corresponding to a DC coefficient and AC coefficients for the first block of an image.

Regarding FIG. 2, a DC decoding process (step S202) results in a DC coefficient for the first block. According to the plurality of AC codes, an AC decoding process is performed to generate a plurality of first AC coefficients for the first block (step S204). Next, a predetermined parameter $AC_{limit}$ is used for determining whether the AC bypassing process is performed (step S208). The predetermined parameter $AC_{limit}$ involves a display resolution and the generated plurality of AC coefficients for the first block from the AC decoding process.

In an embodiment of the invention, an exemplary equation for the predetermined parameter $AC_{limit}$ is defined, but is not limited thereto, as follows:

$$\left(\frac{64}{n^2}\right) - 1,$$

where 64 represents the total DCT coefficients for an 8 by 8 block, i.e., one DC coefficient and sixty-three AC coefficients and n represents a scaling ratio of an original resolution to a display resolution according to a horizontal resolution or a vertical resolution of the image.

For example, when the image has an original resolution of 2560 by 1920 and the display resolution for the image is 1280 by 960, the scaling ratio of the original resolution to the display resolution is determined to be 2 since $$n = \frac{2560}{1280} \text{ or } \frac{1920}{960} = 2.$$

Therefore, the predetermined parameter $$AC_{limit} = \left(\frac{64}{2^2}\right) - 1 = 15.$$

In this example, when at least 15 AC coefficients for the first block have been reproduced, it is then determined to perform the AC bypassing process since the predetermined parameter $AC_{limit}$ has been reached (step S210).

In an embodiment of the invention, the remaining AC coefficients for the first block may be directly set to zero in the AC bypassing process, without further decoding, thereby reducing decoding time for AC coefficients. The AC bypassing process continues until all sixty-three AC coefficients for the first block have been decoded or zero-valued (step S206). After the AC bypassing process is completed, a second unit of the bit stream corresponding to a second block following the first block is obtained. The AC bypassing process according to the invention will be described below in detail with reference to FIGS. 4 and 5.

Note that when the display resolution for the image (such as 1280 by 960) is larger than the original resolution (such as 2560 by 1920), i.e., the scaling ratio n<1, the predetermined parameter $AC_{limit}$ is defined as the total number of AC coefficients for the block (that is, $AC_{limit}=63$), indicating all AC coefficients for the block which are required to be decoded.

It is also noted that if the original resolution is significantly greater than the display resolution, for example, when the scaling ratio $n \geq 8$, the predetermined parameter $AC_{limit}$ is determined to be zero so as to bypass the process for decoding all of the AC coefficients for the block. In this regard, only the DC coefficient is required for the display resolution.

Figure 3:
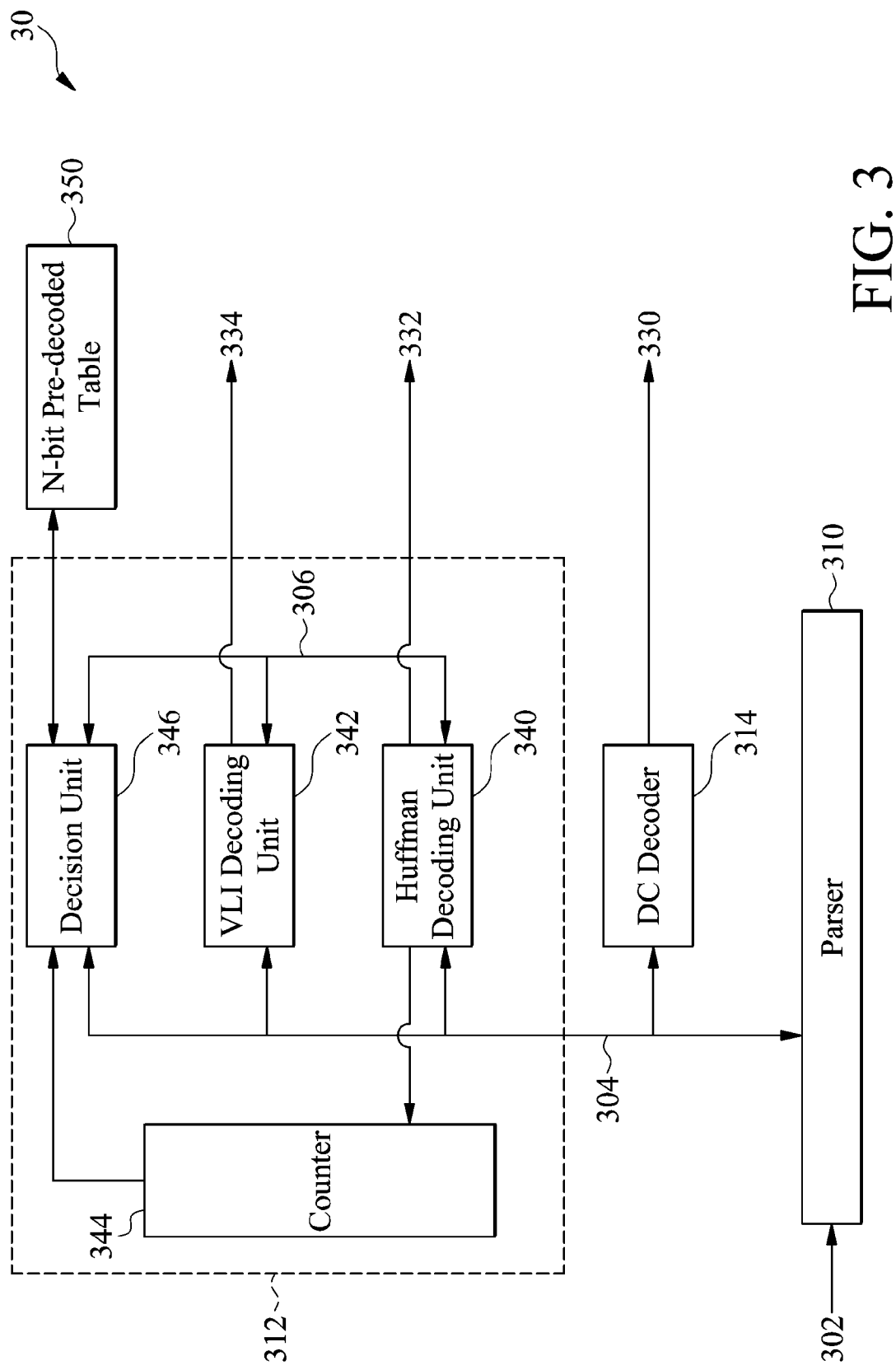
FIG. 3 is block diagram of an image decoding apparatus according to one embodiment of the invention.

FIG. 3 is block diagram of an image decoding apparatus 30 according to one embodiment of the invention. Referring to FIG. 3, the image decoding apparatus 30 comprises a parser 310, a DC decoder 314 and an AC decoder 312. The parser 310 is provided for parsing a bit stream 302 to acquire an encoded unit data 304 for decoding, such as a first unit. The first unit comprises a DC code and a plurality of AC codes respectively corresponding to a DC coefficient and AC coefficients for a first block of the image. For example, the first block is an 8 by 8 block consisting of one DC coefficient followed by sixty-three AC coefficients. The bit stream 302 is a Huffman encoded bit stream. The DC decoder 314 coupled to the parser 310 receives the DC code of the first unit and reproduces a DC coefficient 330 for the first block. The AC decoder 312 is coupled to the DC decoder 314. By decoding the plurality of AC codes of the first unit, the AC decoder 312 generates a plurality of first AC coefficients 332 and 334 for the first block. The process of generating the plurality of first AC coefficients 332 and 334 will be described herein below in details. Further, the AC decoder 312 determines whether the number of the plurality of first AC coefficients 332 and 334 exceeds a predetermined parameter $AC_{limit}$. If so, the AC decoder 312 performs an AC bypassing process on the first unit so as to obtain a next encoded unit data 304, such as a second unit of the bit stream 302 corresponding to a second block following the first block. Note that each AC code from the encoded unit data 304 comprises a Huffman code and a VLI code.

More specifically, the AC decoder 312 further comprises a Huffman decoding unit 340, a variable length integer (VLI) decoding unit 342, a counter 344 and a decision unit 346. The Huffman decoding unit 340 extracts length information 306 having a zero run length and a VLI length according to the Huffman code in each AC code. Thus, the plurality of first AC coefficients 332 are determined to be zero-valued according to the zero run length. Then, the variable length integer decoding unit 342 receives the VLI length and generates a predetermined AC coefficient 334 according to the VLI code in each AC code and the VLI length from the Huffman decoding unit 340. The counter 344 accumulates the number of generated AC coefficients from the Huffman decoding unit 340. As a result, the decision unit 346 determines whether the AC bypassing process is performed on the first unit in accordance with the predetermined parameter $AC_{limit}$, the length information 306 and the number counted by the counter 344. Note that the AC bypassing process for bypassing undesired AC coefficients within the first block is described in more detail in the following description with reference to FIGS. 4 and 5.

Figure 4:
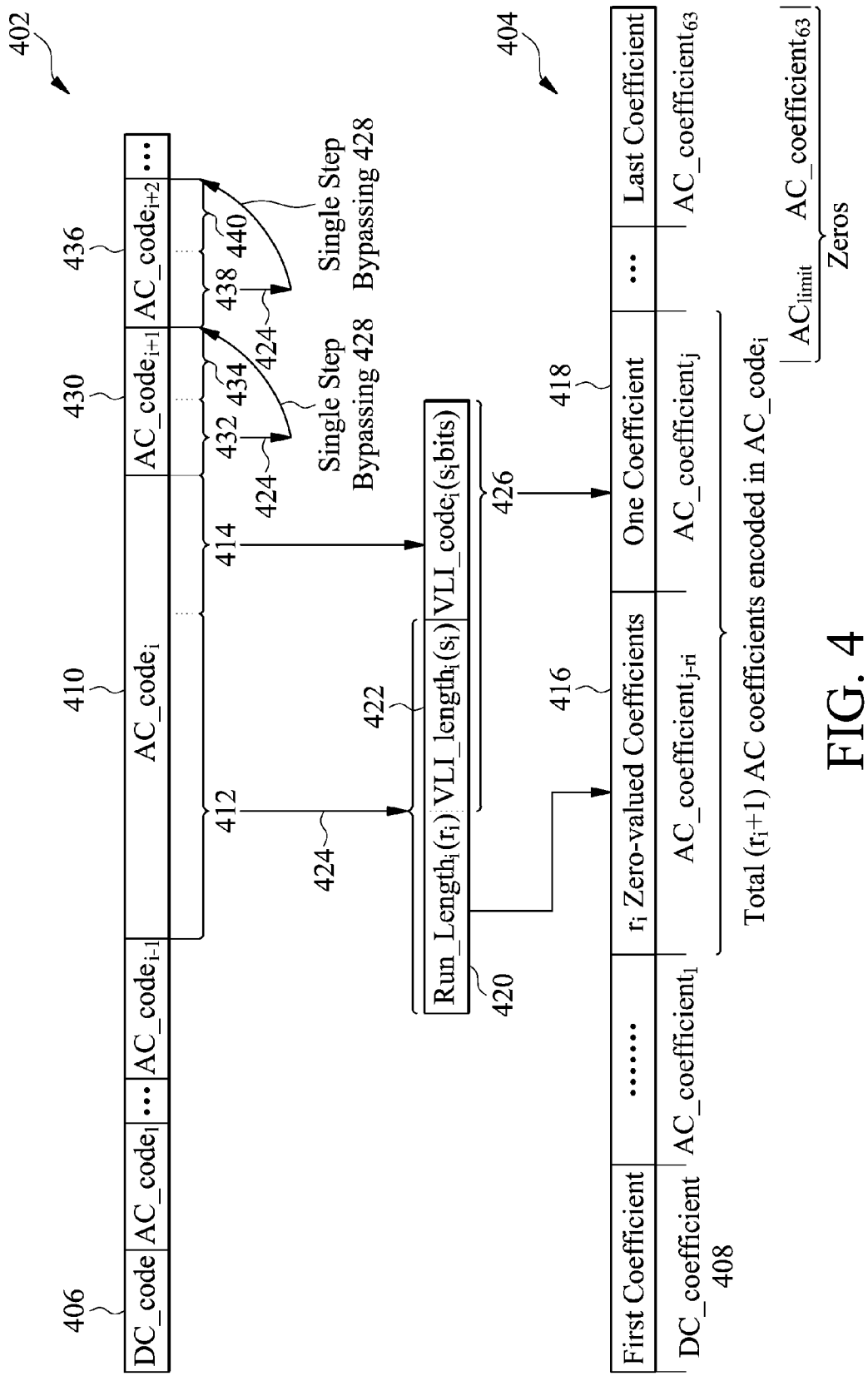
FIG. 4 is a diagram illustrating an AC bypassing process for decoding an encoded unit data of a bit stream into DCT coefficients according to one embodiment of the invention.

FIG. 4 is a diagram illustrating an AC bypassing process for decoding an encoded unit data of a bit stream into DCT coefficients 404 according to one embodiment of the invention. In this embodiment, the encoded unit data is a first unit 402 of a bit stream 302 shown in FIG. 3. Further, the AC bypassing process is a single step bypassing process 428.

Referring to FIG. 4, the first unit 402 comprises a DC_code 406 and a plurality of AC codes, such as $AC\_code_1$ ... $AC\_code_{i-1}$ ... $AC\_code_i$, $AC\_code+_1$, $AC\_code_{i+2}$ and so on. The DC_code 406 and the plurality of AC codes are respectively corresponding to a DC_coefficient 408 and AC coefficients, from $AC\_coefficient_1$ to $AC\_coefficient_{63}$, of the DCT coefficients 404 for a first block of an image.

When operating, each AC code, such as an $AC\_code_i$ 410, comprises a $Huffman\_code_i$ 412 and a $VLI\_code_i$ 414. From the aforementioned description, the AC code 410 is subsequently transmitted to the AC decoder 312 in FIG. 3, so as to generate a number of corresponding AC coefficients, such as $r_i$ zero-valued coefficients 416 and a predetermined AC coefficient 418 such as $AC\_coefficient_j$ shown in FIG. 4. To be more specific, the Huffman decoding unit 340 performs a Huffman decoding method 424 on the $Huffman\_code_i$ 412 to extract a zero run length and a VLI length, such as $Run\_Length_i$ 420 and $VLI\_length_i$ 422. Further, the generated predetermined AC coefficient 418 employs the use of the $VLI\_code_i$ 414 and the $VLI\_length_i$ 422. That is, the variable length integer decoding unit 342 in FIG. 3 determines the predetermined AC coefficient 418 by performing a variable length integer (VLI) decoding method 426 on the $VLI\_code_i$ 414 and the $VLI\_length_i$ 422.

In this embodiment, it is assumed that the value of the zero run length is $r_i$, indicating the number of zeros preceding the predetermined AC coefficient 418. Thus, the total number of AC coefficients derived from the $AC\_code_i$ 410 is $(r_i+1)$. Moreover, the bit length of the $Huffman\_code_i$ 412 and the $VLI\_code_i$ 414 is accordingly derived from the Huffman decoding unit 340. With reference to FIG. 4, the bit length is equal to $(h_i+s_i)$ bits according to the bit length of Huffman code 412 ($h_i$ bits) and the VLI code 414 ($s_i$ bits).

When the bit length of the $VLI\_code_i$ 414 is zero (i.e., $s_i$ is equal to 0), two markers ZRL and EOB are handled to respectively indicate that sixteen zeros is encountered and the remaining AC coefficients until the end of the first block are all zeros.

From the above-mentioned process for decoding the first unit 402 to generate the DCT coefficients 404 of FIG. 4, the single step bypassing process 428 is described below in detail with reference to FIGS. 3 and 4.

As mentioned above, the decision unit 346 in FIG. 3 determines whether the single step bypassing process 428 is performed on the first unit 402 in FIG. 4. Note that assumptions are performed that the original resolution is 2560 by 1920 and the display resolution for the image is 1280 by 960. Thus, the scaling ratio n is equal to 2, thereby determining that the predetermined parameter $AC_{limit}$=15. Therefore, instead of decoding sixty-three AC coefficients for the first block, fifteen AC coefficients are substantially sufficient for the display resolution.

It is assumed that the predetermined parameter $AC_{limit}$ has been reached after the decoding of an AC code, such as the $AC\_code_i$ 410 in FIG. 4. Then, the decision unit 346 in FIG. 3 determines to execute the single step bypassing process 428 as shown FIG. 4.

In this illustrated embodiment, the Huffman decoding unit 340 decodes a current AC code, such as an $AC\_code_{i+1}$ 430 consisting of a $Huffman\_code_{i+1}$ 432 and a $VLI\_code_{i+1}$ 434 shown in FIG. 4. Afterwards, a zero run length and a VLI length for the $Huffman\_code_{i+1}$ 432 are reproduced. Additionally, the bit length of the $Huffman\_code_{i+1}$ 432 (such as $h_{i+1}$ bits) and the $VLI\_code_{i+1}$ 434 (such as $s_{i+1}$ bits) is subsequently determined to be $(h_{i+1}+s_{i+1})$ bits. Then, the $(h_{i+1}+s_{i+1})$ bits of data are discarded to acquire a next AC code from the first unit 402, such as an $AC\_code_{i+2}$ 436. The zero run length is used by the counter 344 to determine a first value, accumulating the number of derived AC coefficients. For example, assuming that the zero run length for $Huffman\_code_{i+1}$ 432 is 3, the first value is set to 15 (AC coefficients for the $AC\_code_i$ 410)+3+1 (a predetermined AC coefficient for $AC\_code_{i+1}$ 430)=19. Because the first value is smaller than the total AC coefficients for the first block, the Huffman decoding unit 340 proceeds to decode a $Huffman\_code_{i+2}$ 438 of the $AC\_code_{i+2}$ 436 followed by the $AC\_code_{i+1}$ 430 and further extract the bit length of the $Huffman\_code_{i+2}$ 438 and a $VLI\_code_{i+2}$ 440 of $AC\_code_{i+2}$ 436 shown in FIG. 4. Also, all of the four AC coefficients for the $AC\_code_{i+1}$ 430 are determined to be zero regardless of the $VLI\_code_{i+1}$ 434.

In particular, if the first value is greater than 63 or the zero run length and the VLI length are both zero (EOB marker), then it means that it is the end of a block and a new block decoding process should be started. Thus, the $AC\_code_{i+1}$ 430 is the last AC code of the first unit 402 and the single step bypassing process 428 has completed the first block.

Figure 5:
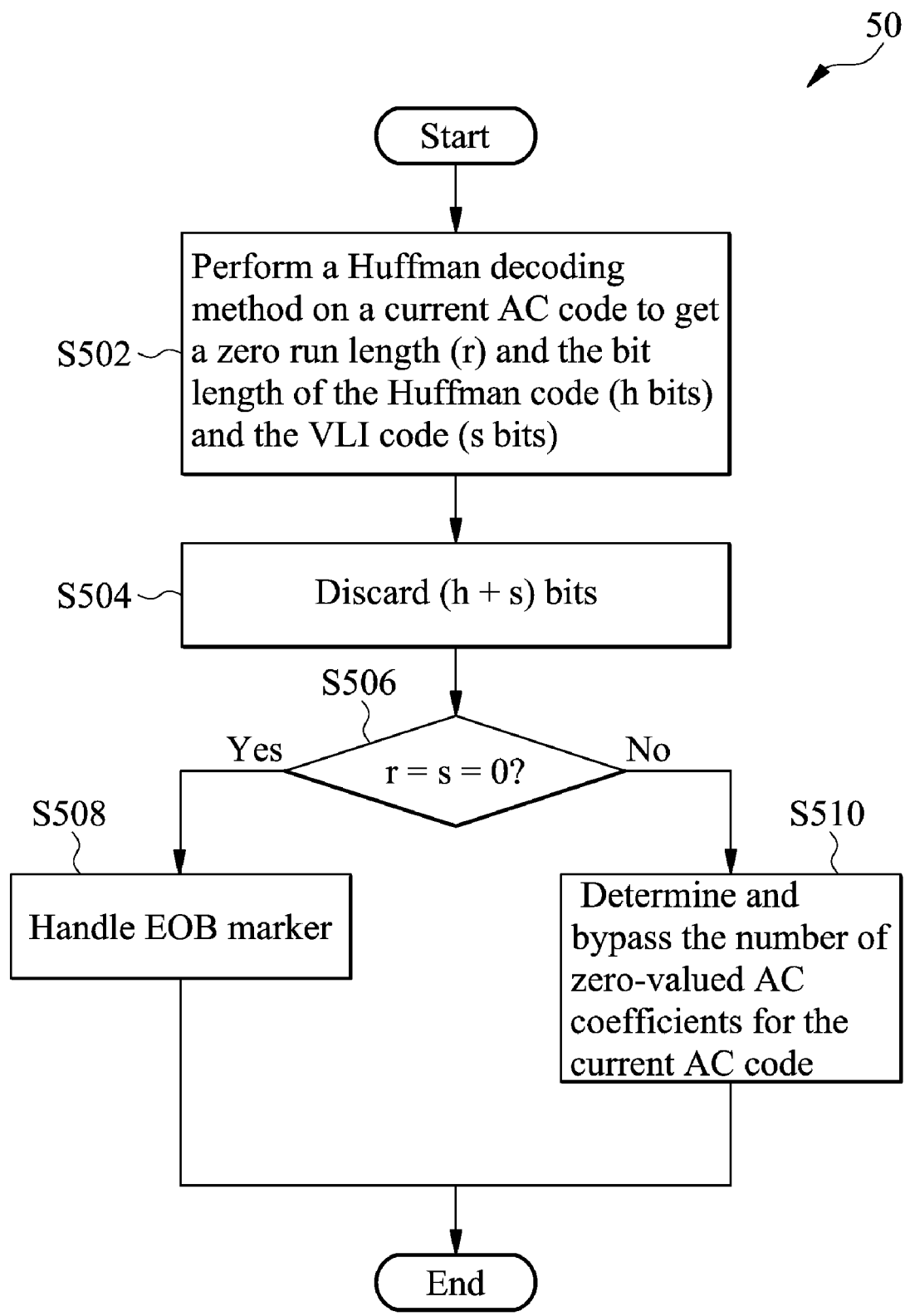
FIG. 5 is a flowchart of a single step bypassing process in accordance with the embodiment of FIGS. 3 and 4.

FIG. 5 is a flowchart of a single step bypassing process 50 in accordance with the embodiment of FIGS. 3 and 4.

With reference to FIGS. 3, 4 and 5, according to an embodiment of the invention, when the decision unit 346 determines to perform a single step bypassing process 50, a Huffman decoding method is then performed on the Huffman code of a current AC code, e.g. the $AC\_code_{i+1}$ 430, to extract a zero run length (such as $r_{i+1}$ for the $AC\_code_{i+1}$ 430) and a VLI length for the current AC code. The bit length of the Huffman code (such as $h_{i+1}$ bits for the $AC\_code_{i+1}$ 430) and the VLI code (such as $s_{i+1}$ bits for the $AC\_code_{i+1}$ 430) for the current AC code is also retrieved (step S502).

Next, bypassed bits for bypassing the current AC code is calculated, such as $(h_{i+1}+s_{i+1})$ bits corresponding to the $AC\_code_{i+1}$ 430 as shown in FIG. 4. The bypassed bits, i.e., $(h_{i+1}+s_{i+1})$ bits, are then discarded to acquire a next AC code following the current AC, such as the $AC\_code_{i+2}$ 436 as shown in FIG. 4 (step S504).

Afterwards, it is determined whether the bit length of the VLI code and the zero run length for the current AC code are both zero (step S506). If yes, as an example, in the case of $r_{i+1}=s_{i+1}=0$, the $AC\_code_{i+1}$ 430 is the EOB maker for a proceeding block (step S508). If not, the number of zero-valued AC coefficients for the current AC code is determined and bypassed in accordance with the zero run length reproduced from the current AC code (step S510). Finally, the total AC coefficients that have been generated for the proceeding block are accumulated. The accumulated value is provided for determining whether the Huffman decoding method should proceed to decode the next AC code. With this single step bypassing process 50, the decoding speed and throughput are significantly improved over the prior art.

Figure 6:
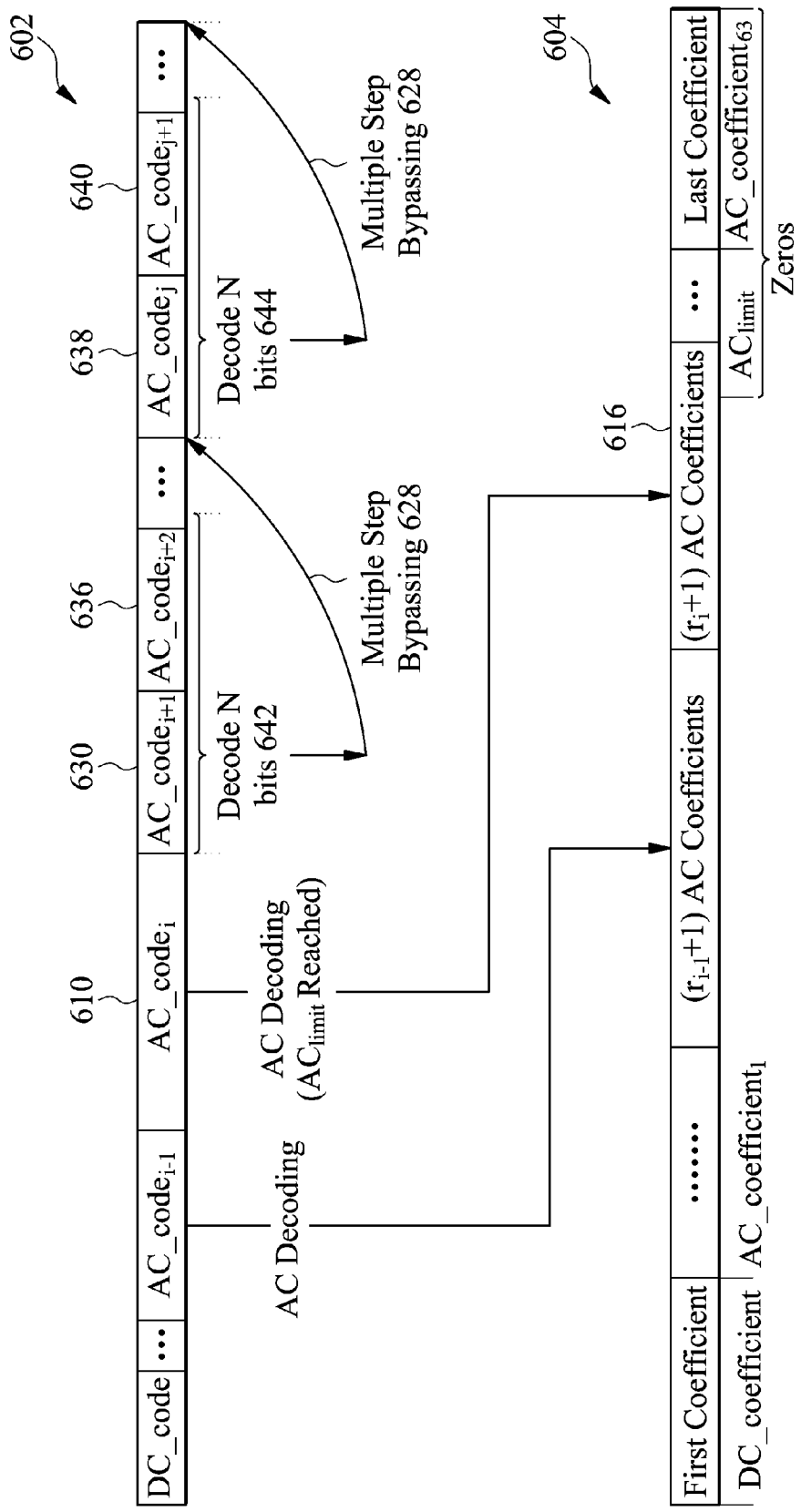
FIG. 6 is a diagram illustrating an AC bypassing process for decoding an encoded unit data of a bit stream into DCT coefficients according to another embodiment of the invention.

FIG. 6 is a diagram illustrating an AC bypassing process for decoding an encoded unit data of a bit stream into DCT coefficients 604 according to another embodiment of the invention. In this embodiment, the encoded unit data is a first unit 602 of a bit stream 302 (in FIG. 3) corresponding to a first block of an image shown. Further, the AC bypassing process is a multiple step bypassing process 628.

Similarly as previous, it is assumed that a predetermined parameter $AC_{limit}$ has been reached after the decoding of an AC code, such as the $AC\_code_i$ 610. The remaining AC coefficients for the first block are zero-valued.

Then, the decision unit 346 in FIG. 3 determines to execute the multiple step bypassing process 628 as shown FIG. 6. The Huffman decoding unit 340 in FIG. 3 reproduces total bypassed bits (L), total AC count (R) and a flag by decoding an N-bit data 642 from the first unit 602, where the total AC count indicates the AC coefficients decoded from the N-bit data 642. Note that the N-bit data 642 comprises a plurality of AC codes, such as $AC\_code_{i+1}$ 630, $AC\_code_{i+2}$ 636 and so on. The process for decoding the N-bit data 642 will be discussed below in reference to FIG. 8.

In this illustrated embodiment, the flag is an EOB marker including a first state and a second state respectively indicating whether the end of the first unit 602 for the first block has been found. Also, the determination of the flag will be described in more detail below with reference to FIG. 8.

According to FIG. 3, the decision unit 346 retrieves a second value from the counter 344 by adding the total AC count and the accumulated number of AC coefficients that have been generated from the first unit 602 in FIG. 6.

Further, the decision unit 346 determines whether the second value exceeds 63 AC coefficients for the first block. If not, the state of the flag (such as an EOB) is then determined. When the flag is in the second state, the total AC count (R) of AC coefficients is bypassed and zero-valued. In FIG. 6, the first unit 602 discards the total bypassed bits (L) to obtain a next N-bit data 644 following the N-bit data 642. The Huffman decoding unit 340 in FIG. 3 proceeds to decode the next N-bit data 644 consisting of $AC\_code_j$ 638, $AC\_code_{j+1}$ 640 . . . etc. Meanwhile, when the flag is in the first state, the decision unit 346 checks if the second value is equal to 63. In response to the determination result, a bypass is performed to acquire a second unit of the bit stream corresponding to a second block according to the total bypassed bits and predetermined bypassed bits, where the predetermined bypassed bits is a constant number associated with the bit length of the flag, such as the bit length of the EOB marker. Consequently, completing the decoding of the first unit for the first block.

If the second value is larger than 63 AC coefficients from the first unit 602, a bypass is performed by the total bypassed bits over the first block (not shown). In other words, instead of the multiple step bypassing process, the single step bypassing process is used to decode one AC code each time until a second unit following the first unit 602 is obtained. In detail, the Huffman decoding unit 340 proceeds to decode each AC code (e.g. $AC\_code_i$ 630, $AC\_code_{i+1}$ 636 . . . etc) in sequence until obtaining the second unit corresponding to a second block.

Figure 7:
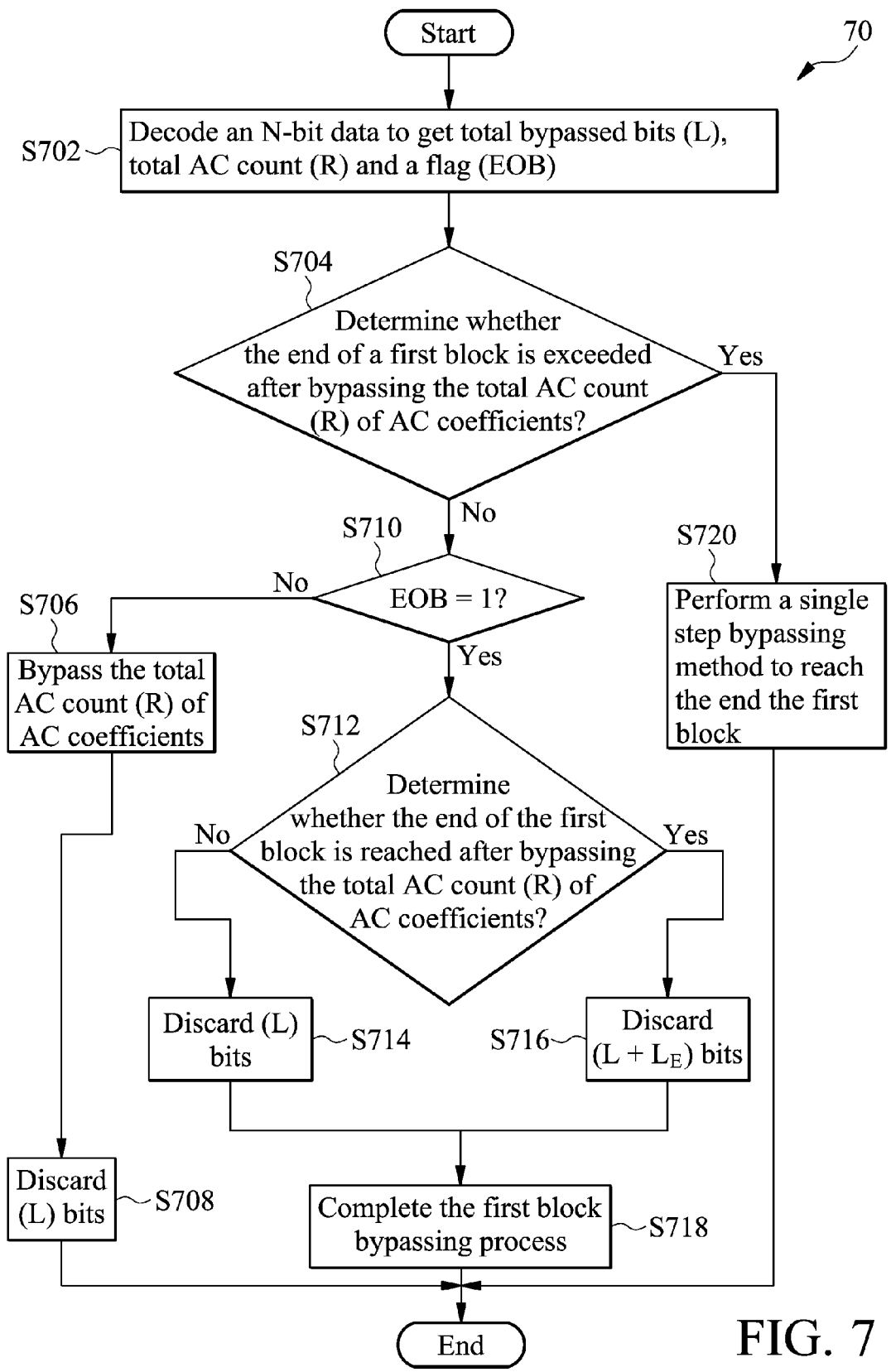
FIG. 7 is a flowchart of a multiple step bypassing process in accordance with the embodiment of FIG. 6.

FIG. 7 is a flowchart of a multiple step bypassing process in accordance with the embodiment of FIG. 6.

With reference to FIGS. 3, 6 and 7, according to an embodiment of the invention, when the decision unit 346 determines to perform a multiple step bypassing process, a Huffman decoding method is provided to decode an N-bit data 642 from the first unit 602 of a bit stream. Accordingly, total bypassed bits (L), total AC count (R) and a flag are reproduced (step S702), where the total AC count (R) indicates the AC coefficients decoded from the N-bit data 642. From the aforementioned description, the flag may be an EOB marker having a first state and a second state respectively indicating whether the end of the first unit 602 for a first block is found. Moreover, the determination of the flag and the process for decoding the N-bit data 642 will be described in more detail below with reference to FIG. 8.

Next, it is determined whether the end of the first block is exceeded after the total AC count (R) of AC coefficients has been bypassed (step S704). More specifically, the determination is completed by comparing a second value with 63 AC coefficients for the first block according to FIG. 6, where the second value is determined by adding the total AC count (R) and the accumulated number of AC coefficients generated from preceding AC codes before the $AC\_code_{i+1}$ 630. When a bypass corresponding to the second value is over the end of the first block, a single step bypassing method is substituted for the multiple step bypassing method, so as to acquire a second unit following the first unit 602 (step S720). If not, a further determination is performed to verify the state of the flag (such as an EOB) (step S710).

When the flag is determined to have the second state, the corresponding AC coefficients for the N-bit data 642 are zero-valued and the total AC count (R) is provided for bypassing the number of AC coefficients (step S706). That is, the number of AC coefficients required to be further processed is determined by subtracting the total AC count (R) from 63 AC coefficients. Additionally, the total bypassed bits (L) is discarded from the first unit 602, so as to obtain a next N-bit data following the N-bit data (step S708), such as an N-bit data 644 shown in FIG. 6.

When the flag is determined to have the first state, it is further determined whether the end of the first block is reached after the total AC count (R) of AC coefficients has been bypassed (step S712). Specifically, it is determined whether the second value is equal to 63 AC coefficients for the first block.

If yes, the flag does not indicate the end of the first unit 602, and an extra bypass is necessary for bypassing the first unit 602 and obtaining the second unit associated with a second block (step S716). In one embodiment, the extra bypass is determined in accordance with the total bypassed bits (L) and a predetermined bypassed bits $L_E$, i.e., $(L+L_E)$ bits, where the predetermined bypassed bits $L_E$ is a constant number associated with the bit length of the flag, such as the bit length of the EOB marker.

If not, the total bypassed bits (L) are discarded to retrieve the second unit (step S714).

As a result, the multiple step bypassing process 70 completes the first block bypassing process after discarding L or $(L+L_E)$ bits, in view of the foregoing (step S718).

Figure 8:
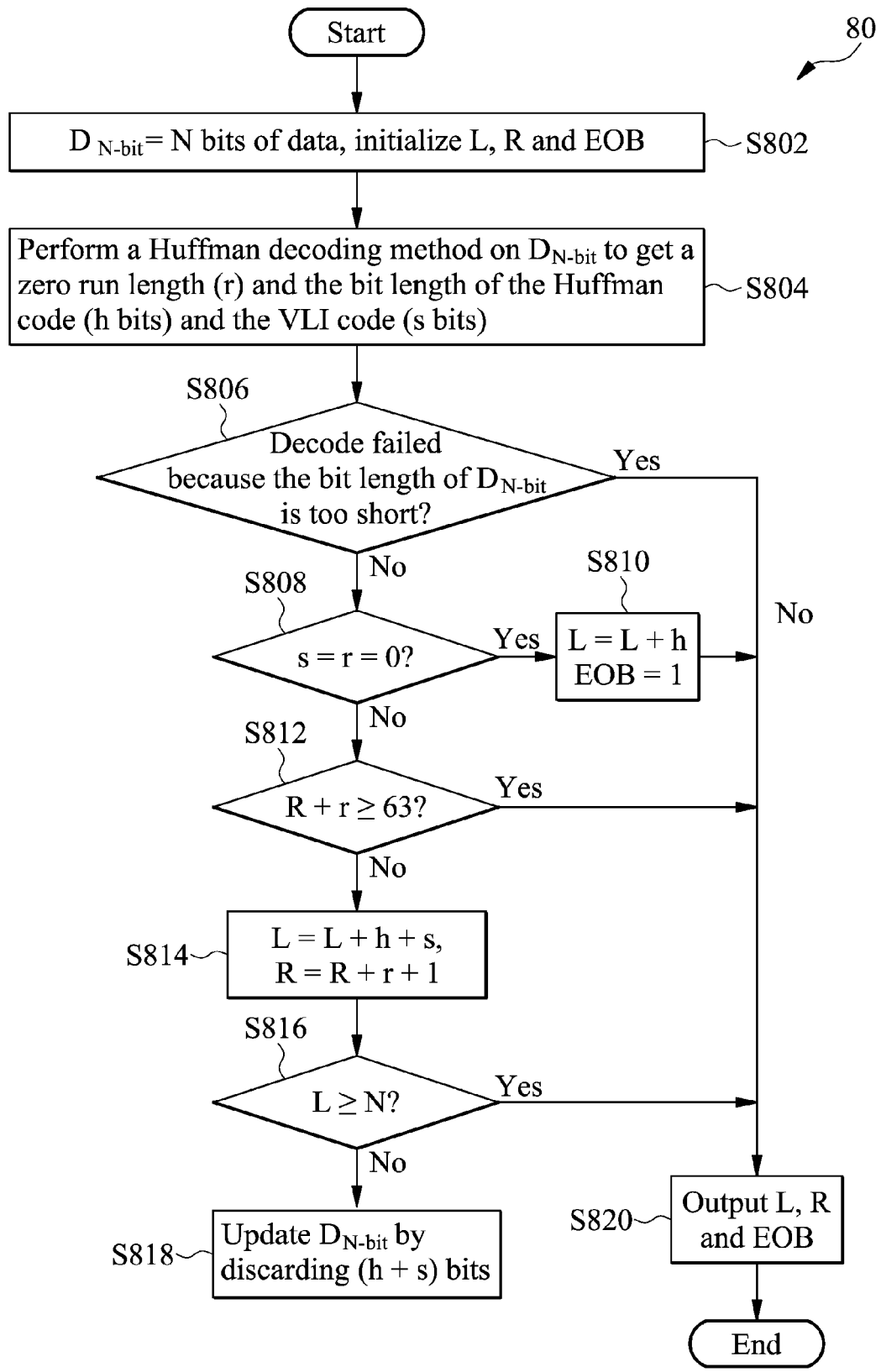
FIG. 8 is an exemplary flowchart illustrating a process for decoding an N-bit data from an encoded unit data of a bit stream in accordance with the embodiment of FIGS. 6 and 7.

FIG. 8 is an exemplary flowchart illustrating a process 80 for decoding an N-bit data from an encoded unit data of a bit stream in accordance with the embodiment of FIGS. 6 and 7.

First, an N-bit data denoted as $D_{N-bit}$ is acquired from a first unit corresponding to a first block. The variables L (total bypassed bits), R (total AC count) and the state of the flag are respectively initialized. In this embodiment, the flag is an EOB marker provided for indicating whether the end of the first unit corresponding to the first block has been found (step S802).

Similar to the embodiment shown in FIG. 4, a Huffman decoding method 424 is performed on the N-bit data $D_{N-bit}$ to extract a zero run length (r). The bit length of the Huffman code (h bits) and the VLI length (s bits) in accordance with a decoding result are also derived (step S804).

It is further determined whether the bit length of the N-bit data $D_{N-bit}$ is too short for decoding (step S806). If so, the process 80 is completed by directly outputting the variables L, R and the state of the flag (step S820).

On the other hand, if the bit length of the N-bit data $D_{N-bit}$ is sufficient for decoding, it is then determined whether the value of the VLI length (s bits) and the zero run length (r) are both zero (step S808).

If so, the flag is determined to be in the first state to indicate that an EOB marker has been found, e.g., set EOB=1 according to this embodiment. Further, the (h) bits are provided for updating the total bypassed bits (L) (step S810), thereby outputting the variables L, R and EOB (step S820).

If the value of (s) or (r) is not equal to zero, the zero run length (r) is added to the total AC count R to update the value of R. It is then determined whether the updated R is equal to 63 or greater than 63 (step S812). If so, the process 80 proceeds to update and output the variables L, R and the state of the flag as described previous (step S810 and S820).

Further, when the updated R is smaller than 63, the process 80 proceeds to update the value of L and R as (step S814):

$$L=L+h+s, \text{ and}$$

$$R=R+r+1.$$

Thereafter, it is determined whether the total bypassed bits (L) reach N (bits) (step S816). If the result shows yes, the process 80 is completed by outputting the variables L, R and the state of the flag (step S820). Otherwise, the N-bit data $D_{N\text{-}bit}$ is updated by discarding the (h+s) bits (step S818). And then, the process 80 returns to the step of performing the Huffman decoding method, so as to repeat the process described previously regarding the updated N-bit data $D_{N\text{-}bit}$.

According to the aforementioned description, the process 80 of decoding the N-bit data $D_{N\text{-}bit}$ is very time-consuming and disadvantageous due to redundant determination, thereby negatively impacting the decoding performance. Further, referring to FIG. 3, the situation can be improved by providing an N-bit pre-decoded table 350 previously established for recording all possible decoding results for the N-bit data $D_{N\text{-}bit}$.

Figure 9:
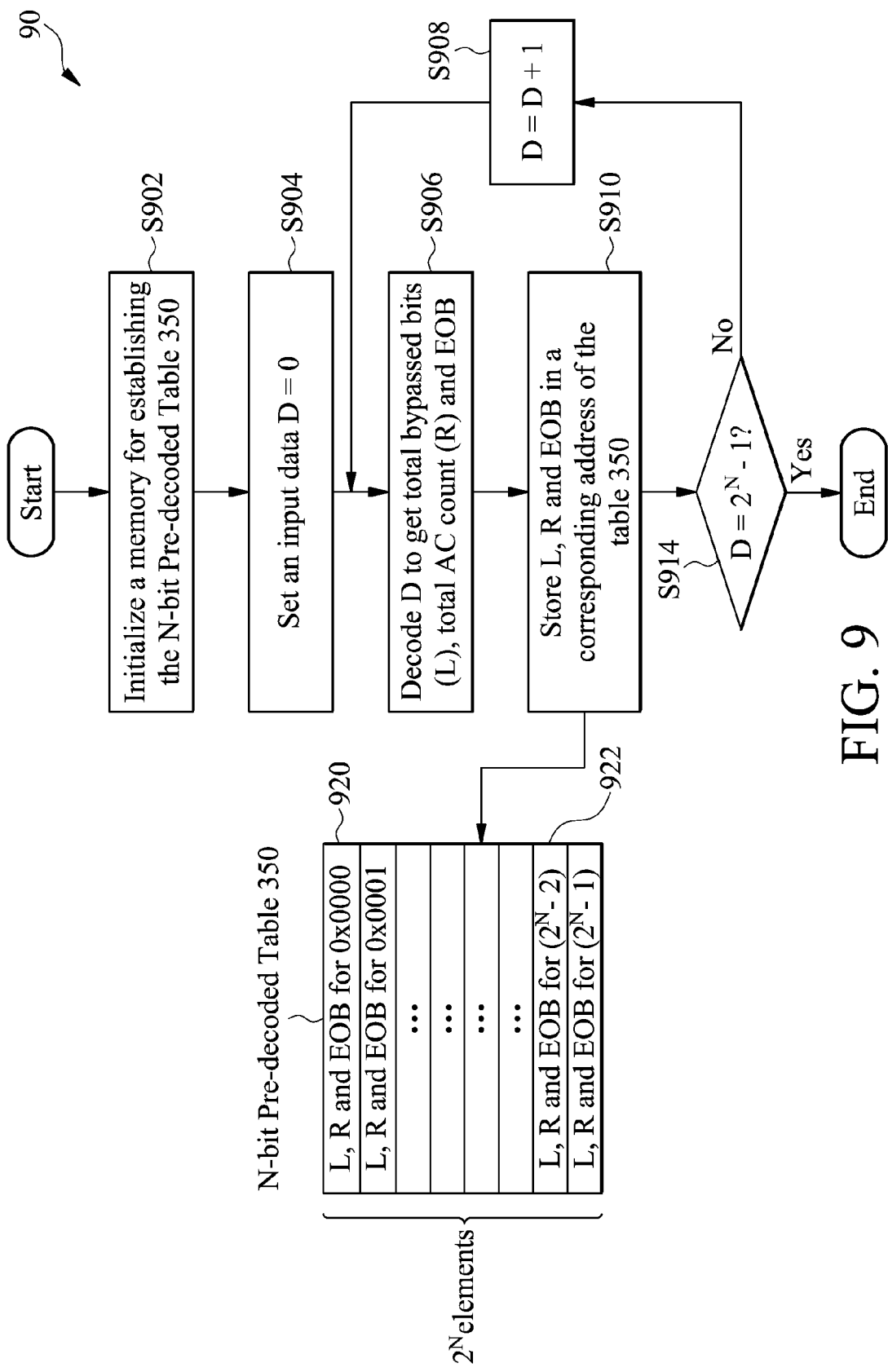
FIG. 9 is an exemplary flowchart illustrating a process for establishing an N-bit pre-decoded table according to still another embodiment of the invention.

FIG. 9 is an exemplary flowchart illustrating a process 90 of establishing an N-bit pre-decoded table 350 according to still another embodiment of the invention. First, a memory for establishing the table 350 is obtained and initialized (step S902). Then, an input data D is set to an initial value 0 (step S904). The process 90 proceeds to decode the input data D to generate total bypassed bits (L), total AC count (R) and the state of a flag (such as an EOB marker) (step S906). For example, to decode the input data D, the process 80 in FIG. 8 as described previously is carried out. Note that the total bypassed bits (L), the total AC count (R) and the state of the flag are illustrated in the embodiments associated with FIGS. 6 and 7, and hence, further description thereof is omitted for brevity.

Next, the values of the total bypassed bits (L), the total AC count (R) and the state of the flag are stored in a corresponding address of the table 350 (step S910). For example, assuming N=16 bits and the input data D=0x0000, a corresponding address 920 is provided for storing the above-mentioned variables decoded from the input data D.

Further, it is determined whether the input data D is equal to ($2^N$−1) (step S914). If so, the process for establishing the N-bit pre-decoded table 350 with $2^N$ elements is completed. Otherwise, the input data D is incremented by 1, i.e., D=D+1, and the process 90 returns to decode the new input data (D+1), such as D=0x0001 (step S908).

With the N-bit pre-decoded table 350 in FIG. 3, the decision unit 346 is capable of performing a straightforward multiple step bypassing process by looking up a decoding result previously stored in a corresponding address in accordance with the N-bit data. For example, assuming N=16 bits and the N-bit data 642 is equal to ($2^{16}$−2), a decoding result of ($2^{16}$−2) is directly read out from the table 350 according to a corresponding address 922 assigned to ($2^{16}$−2). Therefore, it is possible to perform a highly efficient decoding process.

As described above, the image decoding method and apparatus of the invention allow reduced decoding time by bypassing the unnecessary AC coefficients in a block for low display resolutions and substantially improve the overall decoding performance in a simplified and feasible manner without significantly sacrificing the image fidelity over the prior art.

While the invention has been described by way of example and in terms of preferred embodiments, it is to be understood that the invention is not limited to the disclosed embodiments. To the contrary, it is intended to cover various modifications and similar arrangements (as would be apparent o those skilled in the art). Therefore, the scope of the appended claims should be accorded the broadest interpretation so as to encompass all such modifications and similar arrangements.

What is claimed is:

1. An image decoding apparatus comprising:
a parser for parsing a bit stream to acquire a first unit, wherein the first unit comprises a DC code and a plurality of AC codes respectively corresponding to a DC coefficient and AC coefficients for a first block of the image;
an AC decoder for generating a plurality of first AC coefficients for the first block by decoding the plurality of AC codes of the first unit, and determining whether the number of the plurality of first AC coefficients exceeds a predetermined parameter, and, if so, obtaining a second unit of the bit stream corresponding to a second block following the first block by performing an AC bypassing process on the first unit,
wherein each AC code comprises a Huffman code and a VLI code.

2. The image decoding apparatus as claimed in claim 1, wherein the bit stream is a Huffman encoded bit stream.

3. The image decoding apparatus as claimed in claim 1, further comprising:
a DC decoder coupled between the parser and the AC decoder for obtaining the DC coefficient for the first block according to the DC code of the first unit.

4. The image decoding apparatus as claimed in claim 3, wherein the predetermined parameter is determined by an equation:

$$\left(\frac{64}{n^2}\right)-1,$$

wherein 64 represents the DC coefficient and the total number of AC coefficients for the first block and n represents a scaling ratio of an original resolution to a display resolution according to a horizontal resolution or a vertical resolution of the image.

5. The image decoding apparatus as claimed in claim 1, wherein the AC decoder sets the remaining AC coefficients for the first block with a value of zero when the number of the plurality of first AC coefficients exceeds the predetermined parameter.

6. The image decoding apparatus as claimed in claim 1, wherein the AC decoder comprises:
a Huffman decoding unit for generating length information having a zero run length and a VLI length according to the Huffman code of each AC code;

a variable length integer decoding unit for receiving the VLI length and generating a predetermined AC coefficient according to the VLI code of each AC code and the VLI length;

a counter for accumulating the number of AC coefficients from the Huffman decoding unit; and a decision unit for determining whether the AC bypassing process is performed on the first unit in accordance with the predetermined parameter, the length information and the number counted by the counter.

7. The image decoding apparatus as claimed in claim 6, wherein the decision unit performs the AC bypassing process by operating the Huffman decoding unit to generate the zero run length and the VLI length for a current AC code and receiving a first value from the counter by accumulating the number of the plurality of first AC coefficients and the zero run length for the current AC code, wherein a next AC code following the current AC code is acquired according to a bypassed bits calculated from the bit length of the Huffman code and the VLI code corresponding to the current AC code, and wherein the decision unit determines whether the Huffman decoding unit decodes the Huffman code of the next AC code according to the first value.

8. The image decoding apparatus as claimed in claim 7, wherein the current AC code is the last AC code of the first unit when the bit length of the VLI code and the zero run length for the present AC code are zero.

9. The image decoding apparatus as claimed in claim 6, wherein the decision unit performs the AC bypassing process by operating the Huffman decoding unit so that it decodes an N-bit data from the first unit of the bit stream and generates total bypassed bits, total AC count and a flag having a first state and a second state respectively indicating whether the end of the first unit for the first block is found, retrieving a second value from the counter by adding the total AC count and the number of the plurality of first AC coefficients, and determining whether the second value exceeds the total number of AC coefficients for the first block, and, if so, operating the Huffman decoding unit to decode one AC code each time until the second unit of the bit stream corresponding to the second block is obtained.

10. The image decoding apparatus as claimed in claim 9, wherein the total bypassed bits is further discarded from the first unit to obtain a next N-bit data following the N-bit data when the second value is smaller than the total number of AC coefficients for the first block.

11. The image decoding apparatus as claimed in claim 9, wherein the decision unit further determines whether the second value is equal to the total number of AC coefficients for the first block when the flag is determined to have the first state and operates the Huffman decoding unit so that it acquires the second unit of the bit stream corresponding to the second block according to the total bypassed bits and a predetermined bypassed bits in response to the determination result, and wherein the predetermined bypassed bits is a constant number associated with the bit length of the flag.

12. The image decoding apparatus as claimed in claim 6, wherein the decision unit performs the AC bypassing process by utilizing an N-bit pre-decoded table to search a decoding result assigned to an N-bit data from the first unit of the bit stream, obtaining total bypassed bits, total AC count and a flag having a first state and a second state respectively indicating whether the end of the first unit for the first block is found, retrieving a second value from the counter by adding the total AC count and the number of the plurality of first AC coefficients when the flag is determined to have the second state, and determining whether the second value exceeds the total number of AC coefficients for the first block, and, if so, operating the Huffman decoding unit to decode one AC code each time until the second unit of the bit stream corresponding to the second block is obtained.

13. The image decoding apparatus as claimed in claim 4, wherein the predetermined parameter is zero when the scaling ratio $n \geq 8$.

14. The image decoding apparatus as claimed in claim 4, wherein the predetermined parameter is sixty-three when the scaling ratio $n<1$.

15. An image decoding method comprising:
acquiring a first unit of a bit stream, wherein the first unit comprises a DC code and a plurality of AC codes respectively corresponding to a DC coefficient and AC coefficients for a first block of the image;

performing a first stage of an image decoding procedure on the first unit to generate a plurality of first AC coefficients for the first block according to the plurality of AC codes;

determining whether the number of the plurality of first AC coefficients exceeds a predetermined parameter; and performing a second stage of the image decoding procedure on the first unit to obtain a second unit of the bit stream corresponding to a second block following the first block when the number of the plurality of first AC coefficients exceeds the predetermined parameter, wherein each AC code comprises a Huffman code and a VLI code.

16. The image decoding method as claimed in claim 15, wherein the bit stream is a Huffman encoded bit stream.

17. The image decoding method as claimed in claim 15, further comprising:
obtaining the DC coefficient for the first block according to the DC code after the first unit is acquired.

18. The image decoding method as claimed in claim 17, wherein the predetermined parameter is determined by an equation:

$$\left(\frac{64}{n^2}\right) - 1,$$

wherein 64 represents the DC coefficient and the total number of AC coefficients for the first block and n represents a scaling ratio of an original resolution to a display resolution according to a horizontal resolution or a vertical resolution of the image.

19. The image decoding method as claimed in claim 15, further comprising:
setting the remaining AC coefficients for the first block to zero when the number of the plurality of first AC coefficients exceeds the predetermined parameter.

20. The image decoding method as claimed in claim 15, wherein the first stage of the image decoding procedure comprises:
performing a Huffman decoding method on the Huffman code of each AC code to generate a zero run length and a VLI length; and performing a variable length integer decoding method on the VLI code of each AC code to generate a predetermined AC coefficient corresponding to the VLI length.

21. The image decoding method as claimed in claim 15, wherein the second stage of the image decoding procedure is a single step bypassing process comprising the step of:

performing a Huffman decoding method on the Huffman code of a current AC code to obtain a zero run length and a VLI length for the current AC code;

calculating bypassed bits according to the bit length of the Huffman code and the VLI code corresponding to the current AC code;

acquiring a next AC code following the current AC code according to the bypassed bits;

outputting a first value from an accumulated number of the plurality of first AC coefficients and the zero run length for the current AC code; and determining whether the Huffman decoding method on the Huffman code of the next AC code is performed according to the first value.

22. The image decoding method as claimed in claim 21, wherein the current AC code is the last AC code of the first unit when the zero run length and the bit length of the VLI code for the current AC code are zero.

23. The image decoding method as claimed in claim 21, wherein the second stage of the image decoding procedure is a multiple step bypassing method comprising the step of:

acquiring an N-bit data from the first unit of the bit stream;

decoding the N-bit data to obtain total bypassed bits, total AC count, and a flag having a first state and a second state respectively indicating whether the end of the first unit for the first block is found; and determining whether a second value exceeds the total number of AC coefficients for the first block, wherein the second value is generated by adding the total AC count and the number of the plurality of first AC coefficients, and if so, performing the single step bypassing process on the N-bit data to obtain the second unit of the bit stream corresponding to the second block.

24. The image decoding method as claimed in claim 23, wherein the second value is smaller than the total number of AC coefficients for the first block further comprising:

determining whether the flag is determined to have the second state, and if so, discarding the total bypassed bits from the first unit to obtain a next N-bit data following the N-bit data.

25. The image decoding method as claimed in claim 24, wherein the flag is determined to have the first state further comprising:

determining whether the second value is equal to the total number of AC coefficients for the first block; and obtaining the second unit of the bit stream corresponding to the second block according to the total bypassed bits and a predetermined bypassed bits in response to the determination result, wherein the predetermined bypassed bits is a constant number associated with the bit length of the flag.

26. The image decoding method as claimed in claim 23, wherein the Huffman decoding method is provided for decoding the N-bit data.

27. The image decoding method as claimed in claim 23, wherein an N-bit pre-decoded table is provided for decoding the N-bit data by looking up the total bypassed bits, the total AC count, and the flag assigned to the N-bit data.

28. The image decoding method as claimed in claim 18, wherein the predetermined parameter is zero when the scaling ratio $n \geq 8$.

29. The image decoding method as claimed in claim 18, wherein the predetermined parameter is sixty-three when the scaling ratio $n<1$.

* * * * *